US006983563B2

(12) United States Patent
Weder

(10) Patent No.: US 6,983,563 B2
(45) Date of Patent: *Jan. 10, 2006

(54) PLANT PACKAGE HAVING A DECORATIVE COVERING

(75) Inventor: Donald E. Weder, Highland, IL (US)

(73) Assignee: Wanda M. Weder and William F. Straeter, Highland, IL (US), not individually but solely as Trustees of The Family Trust U/T/A/ dated December 8, 1995

(*) Notice: Subject to any disclaimer, the term of this patent is extended or adjusted under 35 U.S.C. 154(b) by 0 days.

This patent is subject to a terminal disclaimer.

(21) Appl. No.: 10/715,592

(22) Filed: Nov. 18, 2003

(65) Prior Publication Data

US 2004/0250471 A1    Dec. 16, 2004

Related U.S. Application Data

(60) Continuation of application No. 10/294,881, filed on Nov. 13, 2002, now abandoned, which is a continuation of application No. 09/691,358, filed on Oct. 18, 2000, now abandoned, which is a continuation-in-part of application No. 08/953,227, filed on Oct. 17, 1997, now abandoned, which is a continuation of application No. 08/783,331, filed on Jan. 16, 1997, now abandoned, which is a continuation of application No. 08/453,718, filed on May 30, 1995, now Pat. No. 5,640,805, which is a division of application No. 08/220,852, filed on Mar. 31, 1994, now Pat. No. 5,572,851.

(51) Int. Cl.
    A01G 9/02    (2006.01)

(52) U.S. Cl. ......................................... 47/72

(58) Field of Classification Search ................... 47/72, 47/41.04
    See application file for complete search history.

(56) References Cited

U.S. PATENT DOCUMENTS 524,219 A    8/1894    Schmidt (Continued)

FOREIGN PATENT DOCUMENTS

AU    4231978    6/1979

(Continued)

OTHER PUBLICATIONS

Speed Cover Brochure, "The Simple Solution For Those Peak Volume Periods", Highland Supply Corporation, © 1989.

(Continued)

*Primary Examiner*—Francis T. Palo
(74) *Attorney, Agent, or Firm*—Dunlap, Codding & Rogers, P.C.

(57) ABSTRACT

A plant package includes a flower pot containing a floral grouping and a flexible sleeve which may be provided with detaching elements at preselected areas. The sleeve may further include a bonding material which connects the sleeve to the flower pot when the flower pot is positioned within the sleeve. When the sleeve is positioned about the flower pot, a lower portion of the sleeve closely surrounds and encompasses the flower pot, and an upper portion of the sleeve extends upwardly from the flower pot and substantially surrounds and encompasses the floral grouping contained within the flower pot. At least a portion of the sleeve is removable via the detaching elements, leaving a portion of the sleeve which forms a decorative plant cover.

5 Claims, 9 Drawing Sheets

U.S. PATENT DOCUMENTS

| | | |
|---|---|---|
| 732,889 A | 7/1903 | Paver |
| 950,785 A | 3/1910 | Pene |
| 1,044,260 A | 11/1912 | Schloss |
| 1,063,154 A | 5/1913 | Bergen |
| 1,446,563 A | 2/1923 | Hughes |
| 1,520,647 A | 12/1924 | Hennigan |
| 1,525,015 A | 2/1925 | Weeks |
| 1,610,652 A | 12/1926 | Bouchard |
| 1,697,751 A | 1/1929 | Blake ............... 229/87 |
| 1,794,212 A | 2/1931 | Snyder |
| 1,811,574 A | 6/1931 | Barrett |
| 1,863,216 A | 6/1932 | Wordingham |
| 1,978,631 A | 10/1934 | Herrlinger ............. 91/68 |
| 2,048,123 A | 7/1936 | Howard ............... 229/87 |
| RE21,065 E | 5/1939 | Copeman .............. 93/2 |
| 2,170,147 A | 8/1939 | Lane ............... 206/56 |
| 2,200,111 A | 5/1940 | Bensel ............... 229/1.5 |
| 2,278,673 A | 4/1942 | Savada et al. ........ 154/43 |
| 2,302,259 A | 11/1942 | Rothfuss ............. 41/10 |
| 2,323,287 A | 7/1943 | Amberg ............. 229/53 |
| 2,355,559 A | 8/1944 | Renner ............. 229/8 |
| 2,371,985 A | 3/1945 | Freiberg ............. 206/46 |
| 2,411,328 A | 11/1946 | MacNab ............. 33/12 |
| 2,510,120 A | 6/1950 | Leander ............. 117/122 |
| 2,529,060 A | 11/1950 | Trillich ............. 117/68.5 |
| 2,540,707 A | 2/1951 | Beukelman ............. 229/21 |
| 2,621,142 A | 12/1952 | Wetherell ............. 154/117 |
| 2,648,487 A | 8/1953 | Linda ............. 229/55 |
| 2,688,354 A | 9/1954 | Berger ............. 150/28 |
| 2,688,914 A | 9/1954 | Eckler |
| 2,774,187 A | 12/1956 | Smithers ............. 47/41 |
| 2,822,287 A | 2/1958 | Avery ............. 117/14 |
| 2,827,217 A | 3/1958 | Clement ............. 206/58 |
| 2,846,060 A | 8/1958 | Yount ............. 206/58 |
| 2,850,842 A | 9/1958 | Eubank Jr. ............. 47/58 |
| 2,883,262 A | 4/1959 | Borin ............. 21/56 |
| 2,989,828 A | 6/1961 | Warp ............. 53/390 |
| 3,003,681 A | 10/1961 | Orsini |
| 3,022,605 A | 2/1962 | Reynolds ............. 47/58 |
| 3,080,680 A | 3/1963 | Reynolds et al. ....... 47/37 |
| 3,094,810 A | 6/1963 | Kalpin ............. 47/37 |
| 3,121,647 A | 2/1964 | Harris et al. ......... 118/202 |
| 3,130,113 A | 4/1964 | Silman ............. 161/97 |
| 3,172,796 A | 3/1965 | Gülker |
| 3,271,922 A | 9/1966 | Wallerstein et al. ....... 53/3 |
| 3,293,100 A | 12/1966 | Questel |
| 3,316,675 A | 5/1967 | Cartwright, Jr. |
| 3,322,325 A | 5/1967 | Bush ............. 229/62 |
| 3,376,666 A | 4/1968 | Leonard ............. 47/41 |
| 3,380,646 A | 4/1968 | Doyen et al. ........ 229/57 |
| 3,405,863 A | 10/1968 | Kugler |
| 3,431,706 A | 3/1969 | Stuck ............. 53/390 |
| 3,508,372 A | 4/1970 | Wallerstein et al. ....... 53/3 |
| 3,510,054 A | 5/1970 | Sanni et al. ......... 229/66 |
| 3,512,700 A | 5/1970 | Evans et al. ......... 229/53 |
| 3,550,318 A | 12/1970 | Remke et al. ......... 47/37 |
| 3,552,059 A | 1/1971 | Moore ............. 47/41.12 |
| 3,554,434 A | 1/1971 | Anderson ............. 229/55 |
| 3,556,389 A | 1/1971 | Gregoire ............. 229/53 |
| 3,557,516 A | 1/1971 | Brandt ............. 53/14 |
| 3,620,366 A | 11/1971 | Parkinson ............. 206/59 |
| 3,681,105 A | 8/1972 | Milutin et al. ........ 117/15 |
| 3,767,104 A | 10/1973 | Bachman et al. ....... 229/7 |
| 3,793,799 A | 2/1974 | Howe et al. ......... 53/32 |
| 3,804,322 A | 4/1974 | Ericson |
| 3,869,828 A | 3/1975 | Matsumoto ........ 47/34.11 |
| 3,888,443 A | 6/1975 | Flanigen ............. 248/152 |
| 3,962,503 A | 6/1976 | Crawford ............. 428/40 |
| 4,043,077 A | 8/1977 | Stonehocker ......... 47/66 |
| 4,054,697 A | 10/1977 | Reed et al. ........... 428/40 |
| 4,091,925 A | 5/1978 | Griffo et al. ......... 206/423 |
| 4,113,100 A | 9/1978 | Soja et al. ........... 206/602 |
| 4,118,890 A | 10/1978 | Shore ............. 47/28 |
| 4,149,339 A | 4/1979 | Hall et al. ........... 47/67 |
| 4,189,868 A | 2/1980 | Tymchuck et al. ....... 47/84 |
| 4,216,620 A | 8/1980 | Weder et al. ......... 47/72 |
| 4,248,347 A | 2/1981 | Trimbee ............. 206/423 |
| D259,333 S | 5/1981 | Charbonneau ........ D9/306 |
| 4,265,049 A | 5/1981 | Gorewitz ............. 47/26 |
| 4,280,314 A | 7/1981 | Stuck ............. 53/241 |
| 4,297,811 A | 11/1981 | Weder ............. 47/72 |
| 4,333,267 A | 6/1982 | Witte ............. 47/84 |
| 4,347,686 A | 9/1982 | Wood ............. 47/73 |
| 4,380,564 A | 4/1983 | Cancio et al. ........ 428/167 |
| 4,400,910 A | 8/1983 | Koudstall et al. ....... 47/84 |
| 4,413,725 A | 11/1983 | Bruno et al. ......... 206/45.33 |
| 4,508,223 A | 4/1985 | Catrambone ........ 206/423 |
| D279,279 S * | 6/1985 | Wagner ............. D11/143 |
| 4,546,875 A | 10/1985 | Zweber ............. 206/0.82 |
| 4,621,733 A * | 11/1986 | Harris ............. 206/423 |
| 4,640,079 A | 2/1987 | Stuck ............. 53/390 |
| 4,717,262 A | 1/1988 | Roen et al. ........... 383/120 |
| 4,733,521 A | 3/1988 | Weder et al. ......... 53/580 |
| 4,765,464 A | 8/1988 | Ristvedt ............. 206/0.82 |
| 4,771,573 A | 9/1988 | Stengel ............. 47/67 |
| 4,773,182 A | 9/1988 | Weder et al. ......... 47/72 |
| 4,801,014 A | 1/1989 | Meadows ............. 206/423 |
| 4,810,109 A | 3/1989 | Castel ............. 383/105 |
| 4,835,834 A | 6/1989 | Weder ............. 29/525 |
| D301,991 S | 7/1989 | Van Sant ............. D11/149 |
| 4,900,390 A | 2/1990 | Colten et al. ........ 156/291 |
| 4,941,572 A | 7/1990 | Harris ............. 206/423 |
| 4,946,290 A | 8/1990 | Matyja ............. 383/10 |
| 4,980,209 A | 12/1990 | Hill ............. 428/34.1 |
| 4,989,396 A | 2/1991 | Weder et al. ......... 53/397 |
| D315,700 S | 3/1991 | Stephens ............. D11/151 |
| 5,073,161 A | 12/1991 | Weder et al. ......... 493/154 |
| 5,074,675 A | 12/1991 | Osgood ............. 383/122 |
| 5,076,011 A | 12/1991 | Stehouwer |
| 5,105,599 A | 4/1992 | Weder ............. 53/399 |
| 5,111,638 A | 5/1992 | Weder ............. 53/397 |
| 5,117,584 A | 6/1992 | Ottenwalder |
| 5,120,382 A | 6/1992 | Weder ............. 156/212 |
| 5,152,100 A | 10/1992 | Weder et al. ......... 47/72 |
| 5,181,364 A | 1/1993 | Weder ............. 53/397 |
| D335,105 S | 4/1993 | Ottenwalder et al. ....... D11/164 |
| 5,199,242 A | 4/1993 | Weder et al. ......... 53/397 |
| 5,205,108 A | 4/1993 | Weder et al. ......... 53/397 |
| 5,228,234 A * | 7/1993 | de Klerk et al. ....... 47/41.01 |
| 5,235,782 A * | 8/1993 | Landau ............. 47/72 |
| 5,239,775 A | 8/1993 | Landau ............. 47/72 |
| 5,249,407 A | 10/1993 | Stuck ............. 53/399 |
| 5,259,106 A | 11/1993 | Weder et al. ......... 29/469.5 |
| 5,307,606 A | 5/1994 | Weder ............. 53/410 |
| 5,315,785 A | 5/1994 | Avôt et al. ........... 47/72 |
| 5,350,240 A | 9/1994 | Billman et al. ......... 383/104 |
| 5,353,575 A | 10/1994 | Stepanek ............. 53/461 |
| 5,361,482 A | 11/1994 | Weder et al. ......... 29/469 |
| 5,388,695 A | 2/1995 | Gilbert ............. 206/423 |
| 5,428,939 A | 7/1995 | Weder et al. ......... 53/397 |
| 5,443,670 A | 8/1995 | Landau ............. 156/191 |
| 5,493,809 A | 2/1996 | Weder et al. ......... 47/72 |
| D368,025 S | 3/1996 | Sekerak et al. ........ D9/305 |
| 5,496,251 A | 3/1996 | Cheng ............. 493/224 |
| 5,496,252 A | 3/1996 | Gilbert ............. 493/224 |
| 5,526,932 A | 6/1996 | Weder ............. 206/423 |
| 5,551,570 A | 9/1996 | Shaffer et al. ......... 206/575 |
| 5,572,849 A | 11/1996 | Weder et al. ......... 53/399 |
| 5,572,851 A | 11/1996 | Weder ............. 53/399 |
| 5,575,107 A | 11/1996 | Doerr |
| 5,575,133 A | 11/1996 | Weder et al. ......... 53/397 |
| 5,595,023 A | 1/1997 | Weder ............. 47/72 |
| 5,617,703 A | 4/1997 | Weder ............. 53/413 |
| 5,624,320 A | 4/1997 | Martinez ............. 472/51 |

| | | | |
|---|---|---|---|
| 5,625,979 A | 5/1997 | Weder | |
| 5,640,805 A * | 6/1997 | Weder | 47/72 |
| 5,647,168 A | 7/1997 | Gilbert | 47/72 |
| 5,647,193 A | 7/1997 | Weder et al. | 53/465 |
| 5,687,469 A | 11/1997 | Weder | 29/469.5 |
| 5,706,605 A | 1/1998 | Alcazar | 47/65.7 |
| 5,715,944 A | 2/1998 | Windisch | 206/423 |
| 5,735,103 A | 4/1998 | Weder | 53/399 |
| 5,758,472 A | 6/1998 | Weder | |
| 5,813,194 A | 9/1998 | Weder | 53/399 |
| D404,684 S | 1/1999 | Shea | D11/164 |
| 5,924,241 A | 7/1999 | Hodge | 47/72 |
| 5,941,020 A | 8/1999 | Weder | 47/72 |
| 5,966,866 A | 10/1999 | Ferguson | 47/41.01 |
| 5,974,730 A | 11/1999 | Chien | 47/41.01 |
| D419,436 S | 1/2000 | Celtorius et al. | D9/305 |
| 6,009,687 A | 1/2000 | Weder | 53/399 |
| 6,047,524 A | 4/2000 | Weder | 53/399 |
| D424,972 S | 5/2000 | Ferguson | D11/143 |
| 6,098,336 A | 8/2000 | Ferguson | 206/423 |
| 6,115,962 A | 9/2000 | Weder et al. | 47/72 |
| 6,129,208 A | 10/2000 | Ferguson | 206/423 |
| 6,129,209 A | 10/2000 | Tchira | 206/423 |
| 6,141,906 A | 11/2000 | Weder | 47/72 |
| 6,182,395 B1 | 2/2001 | Weder | 47/72 |
| 6,183,590 B1 | 2/2001 | Weder | 47/72 |
| 6,266,920 B1 | 7/2001 | Weder | 47/72 |
| 6,286,255 B1 | 9/2001 | Weder et al. | |
| 6,286,256 B1 | 9/2001 | Weder | |
| 6,345,467 B1 | 2/2002 | Weder | |
| 2002/0112401 A1 | 8/2002 | Weder et al. | |

FOREIGN PATENT DOCUMENTS

| | | | |
|---|---|---|---|
| BE | 654427 | * | 1/1965 |
| CH | 560532 | | 4/1975 |
| DE | 15550 | | 6/1900 |
| DE | 345464 | * | 2/1921 |
| DE | 345464 | | 12/1921 |
| DE | 513971 | | 11/1930 |
| DE | 1166692 | | 3/1964 |
| DE | 1962947 | | 6/1971 |
| DE | 2060812 | | 11/1971 |
| DE | 2748626 | | 5/1979 |
| DE | 3445799 | | 6/1986 |
| DE | 3911847 | | 10/1990 |
| DK | 1204647 | | 9/1970 |
| EP | 0050990 | | 5/1982 |
| EP | 0791543 | | 8/1997 |
| FR | 1376047 | | 9/1964 |
| FR | 2036163 | | 12/1970 |
| FR | 2137325 | | 12/1972 |
| FR | 2272914 | | 12/1975 |
| FR | 2489126 | | 3/1982 |
| FR | 2567068 | | 7/1984 |
| FR | 2610604 | | 8/1988 |
| FR | 2603159 | | 3/1989 |
| FR | 2619698 | | 3/1989 |
| GB | 5605 | | 5/1885 |
| GB | 2056410 | | 3/1981 |
| GB | 2074542 | | 11/1981 |
| GB | 2128083 | | 4/1984 |
| GB | 2203127 | | 10/1988 |
| GB | 2212136 | | 7/1989 |
| GB | 2252708 | | 8/1992 |
| IT | 224507 | | 4/1996 |
| JP | 542958 | | 2/1993 |
| JP | 6127555 | | 5/1994 |
| JP | 8-19334 | | 1/1996 |
| NL | 8301709 | | 12/1984 |
| NL | 1000658 | | 1/1996 |
| WO | 9712819 | | 4/1975 |
| WO | 9315979 | | 8/1993 |

OTHER PUBLICATIONS

"Speed Sheets and Speed Rolls" Brochure, Highland Supply Corporation, © 1990.
"Color Them Happy with Highlander Products" © 1992.
"Costa Keeps the Christmas Spirit", Supermarket Floral, Sep. 15, 1992.
"Super Seller", Supermarket Floral, Sep. 15, 1992.
"Halloween", Link Magazine, Sep. 1992.
"Now More Than Ever", Supermarket Floral, Sep. 15, 1992.
Le Plant Sac Advertisement, published prior to Sep. 26, 1987.
"A World of Cut Flower and Pot Plant Packaging" Brochure, Klerk's Plastic Products Manufacturing, Inc., published prior to Mar. 31, 1994, 6 pages.
Chantler & Chantler brochure showing Zipper Sleeve™ and Florasheet®, published prior to Mar. 31, 1994, 2 pages.
"Stand Alone Plastic Bagmaking" brochure, AMI, Atlanta, GA, Feb. 15, 1996, 2 pages.
"Foil Jackets" brochure, Custom Medallion, Inc., Dec., 1996, 2 pages.
"Derwent Abstract" of FR 2610604A. It is noted that the abstract is an incorrect English translation of the contents of the French patent. The French patent does not enable or disclose adhesively attaching the covering to the container. 1988.
"Silver Linings" Brochure, Affinity Diversified Industries, Inc., 1986. The Silver Linings brochure shows a floral sleeve with a closed bottom. The brochure shows, in one embodiment, a vase with flowers inside a "cut flower" sleeve with the sleeve tied with a ribbon about the neck of the vase.
"Special Occasion Printed Highlophane Bags" Brochure, Highland Supply Corporation, 1990, 2 pages.
"Creative Packaging" Brochure, John Henry Company, Sep. 1992.
"Make Highlander Your Headquarters" Brochure, Highland Supply Corporation, 1991.

* cited by examiner

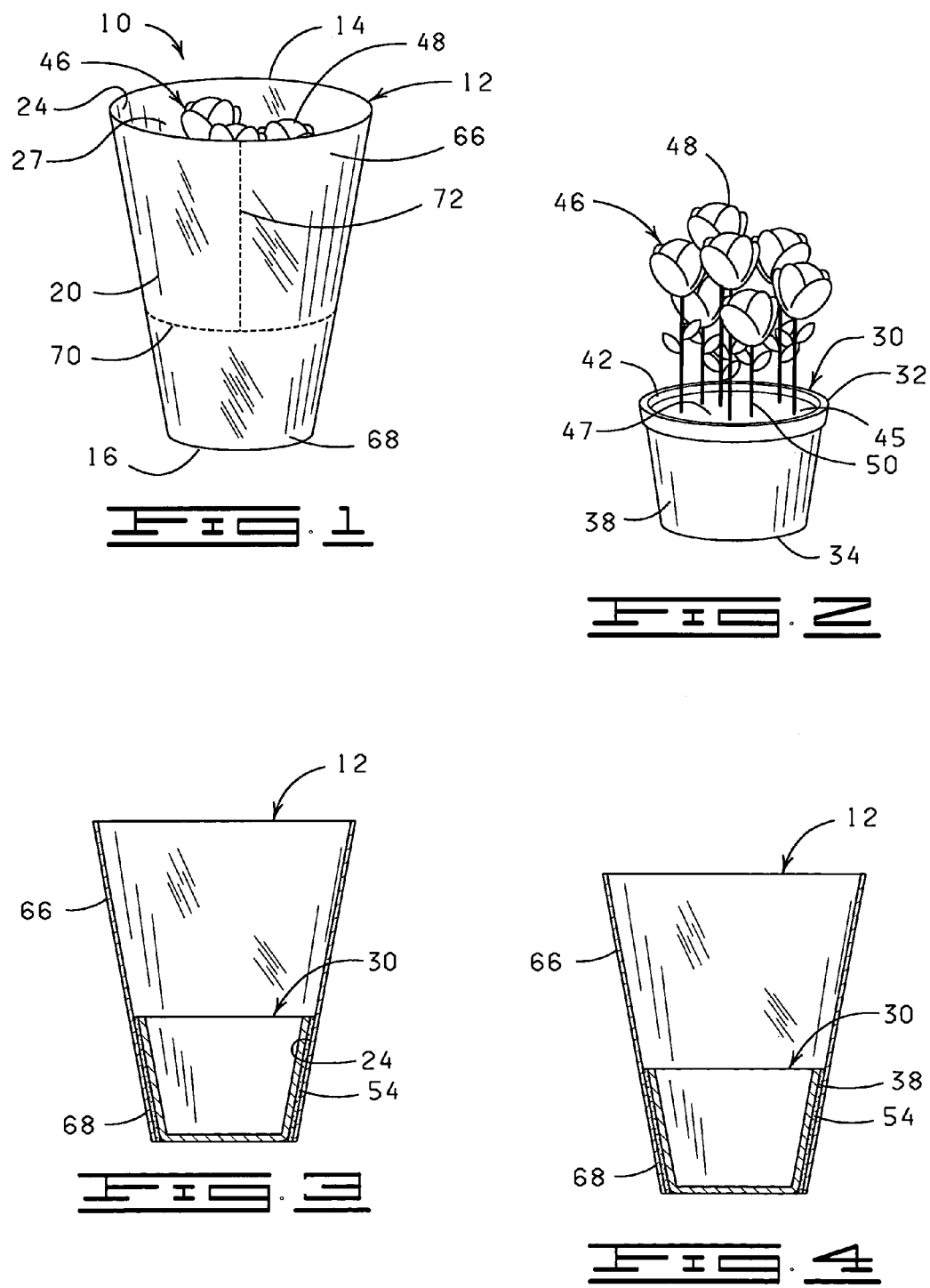

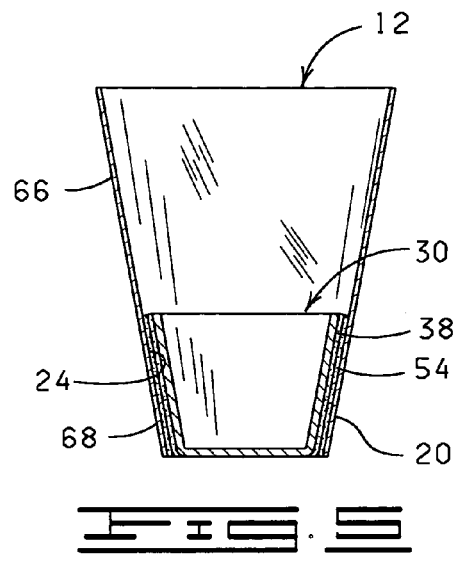
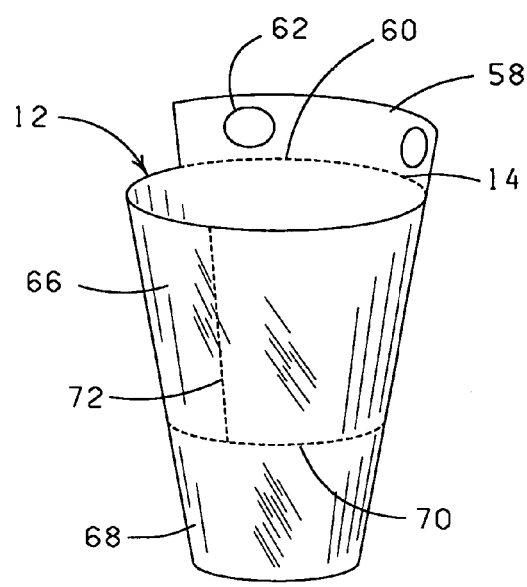
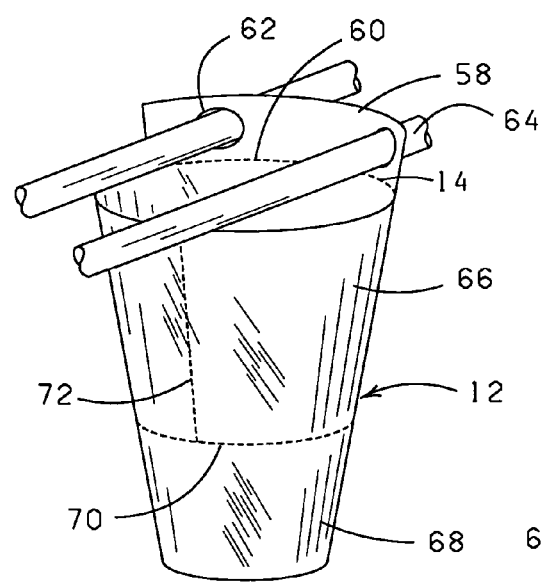
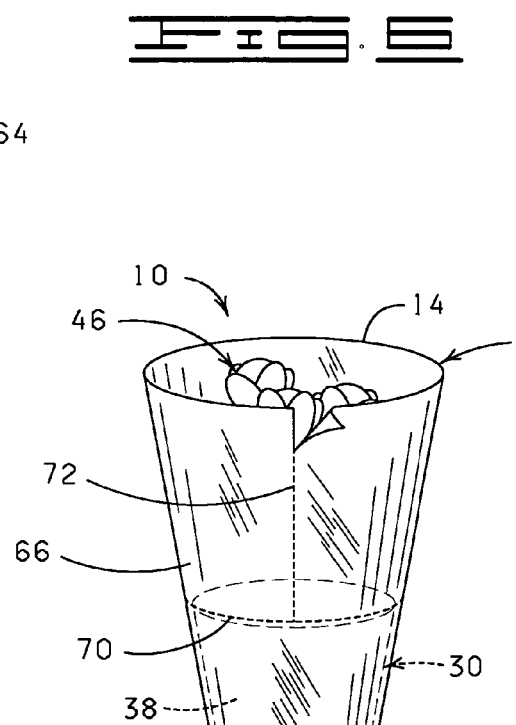

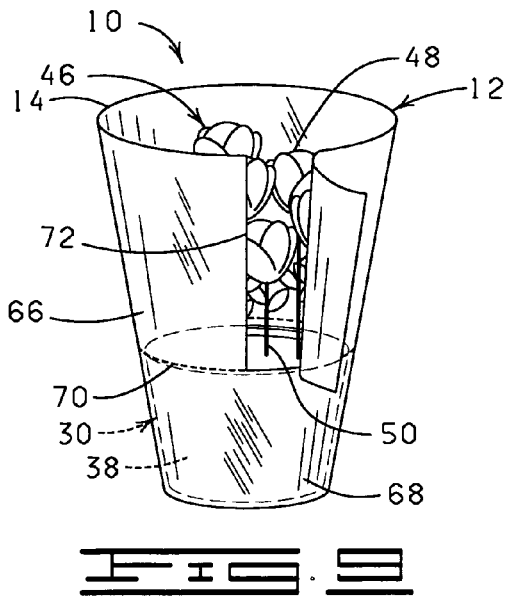
Fig. 9
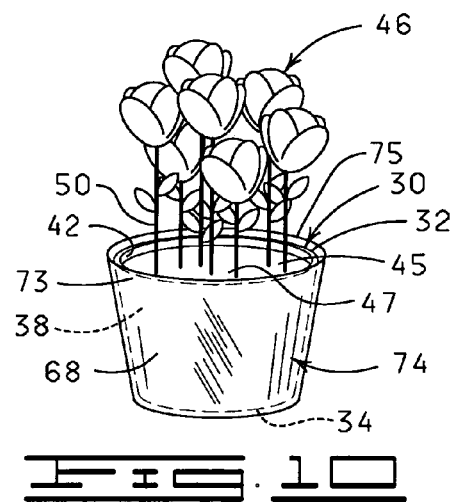
Fig. 10
Fig. 11
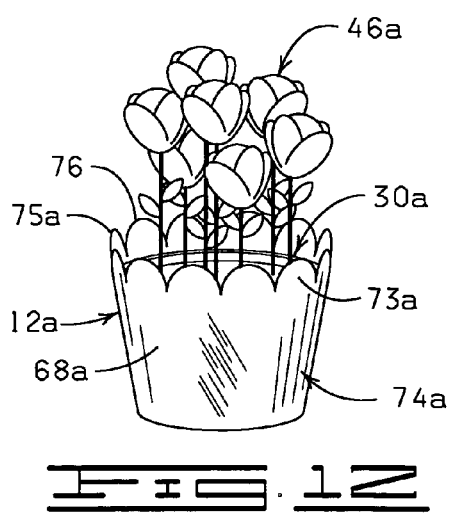
Fig. 12

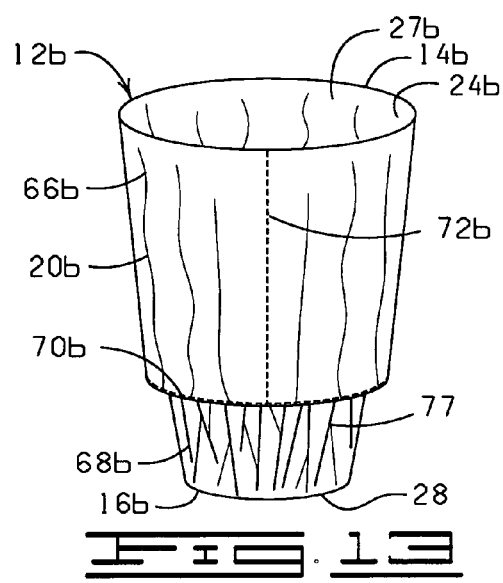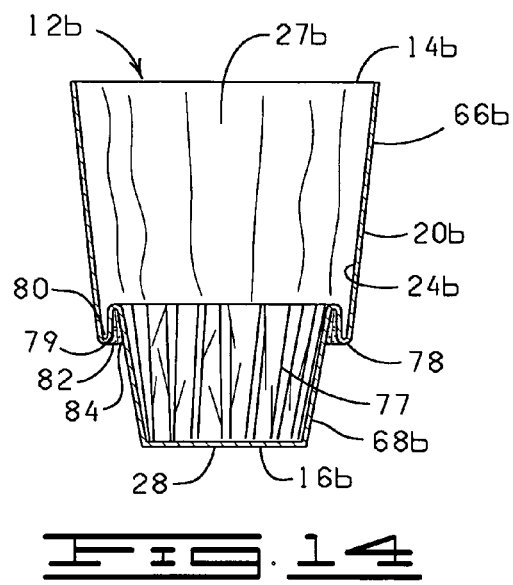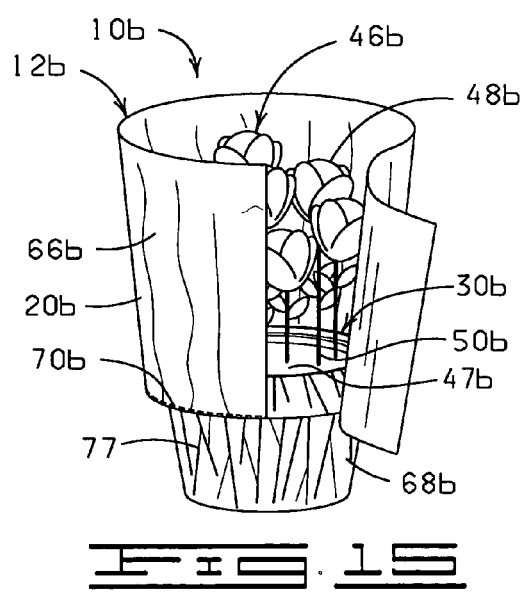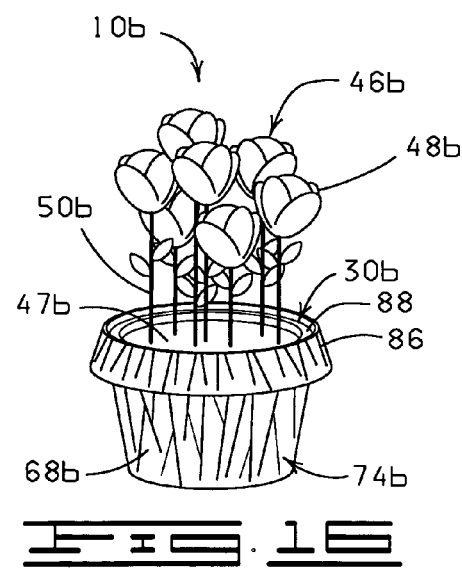

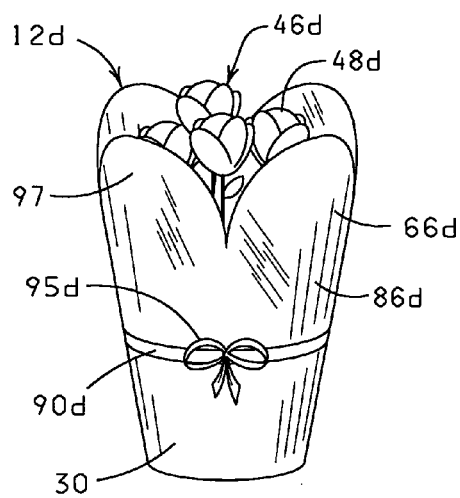
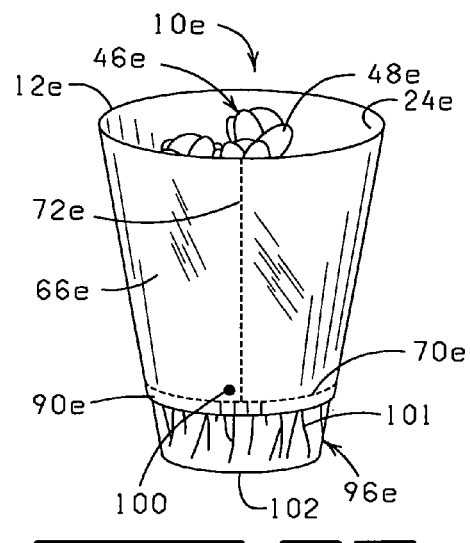
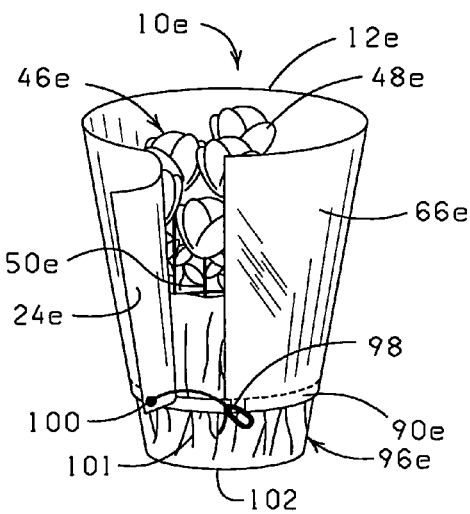
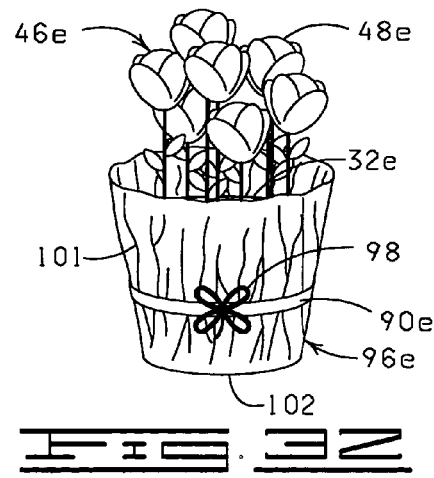
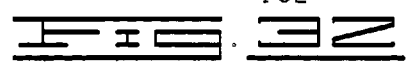

PLANT PACKAGE HAVING A DECORATIVE COVERING

CROSS REFERENCE TO RELATED APPLICATIONS

This application is a continuation of U.S. Ser. No. 10/294,881, filed Nov. 13, 2002, now abandoned; which is a continuation of U.S. Ser. No. 09/691,358, filed Oct. 18, 2000, now abandoned; which is a continuation-in-part of application U.S. Ser. No. 08/953,227, filed Oct. 17, 1997, now abandoned; which is a continuation of U.S. Ser. No. 08/783,331, filed Jan. 16, 1997, now abandoned; which is a continuation of U.S. Ser. No. 08/453,718, filed May 30, 1995, now U.S. Pat. No. 5,640,805, issued Jun. 24, 1997; which is a divisional of U.S. Ser. No. 08/220,852, filed Mar. 31, 1994, now U.S. Pat. No. 5,572,851, issued Nov. 12, 1996. Each of the applications listed above is hereby expressly incorporated herein by reference in its entirety.

FIELD OF THE INVENTION

This invention generally relates to packaging materials, and, more particularly, packaging materials used to wrap flower pots containing floral groupings and/or mediums containing floral groupings, and methods of using same.

BRIEF DESCRIPTION OF THE DRAWINGS

FIG. 1 is a perspective view of a plant package constructed in accordance with the present invention, showing a sleeve having both vertical and circumferential perforations therein, the circumferential perforations dividing the sleeve into an upper portion and a lower portion, and the sleeve having a floral grouping disposed in a flower pot contained therein.

FIG. 2 is a perspective view of a flower pot having a growing medium therein, a floral grouping being disposed into the growing medium within the flower pot.

FIG. 3 is a cross-sectional view of a sleeve having a bonding material connected to an inner peripheral surface of the sleeve, and a flower pot contained within the sleeve, the bonding material connecting the flower pot to the inner peripheral surface of the sleeve.

FIG. 4 is a cross-sectional view of a sleeve having a flower pot contained therein wherein a bonding material is connected to an outer peripheral surface of the flower pot, the bonding material connecting the outer peripheral surface of the flower pot to an inner peripheral surface of the sleeve.

FIG. 5 is a cross-sectional view of a sleeve having a bonding material connected to an inner peripheral surface thereof and a flower pot contained therein wherein the flower pot has a bonding material connected to an outer peripheral surface thereof, both bonding materials cooperating to connect the outer peripheral surface of the flower pot and the inner peripheral surface of the sleeve together.

FIG. 6 is a perspective view of a sleeve having a detachable extension attached to a portion of an upper end of the sleeve, the extension having apertures therein.

FIG. 7 is a perspective view of sleeve of FIG. 6 having rods extending through the apertures in the extension of the sleeve.

FIG. 8 is a perspective view of the plant package of FIG. 1 but showing a partial detachment of the vertical perforations in the upper portion of the plant package.

FIG. 9 is a perspective view of the plant package of FIGS. 1 and 8 but showing the upper portion of the sleeve being detached from the lower portion thereof via both the vertical perforations in the upper portion and the circumferential perforations.

FIG. 10 is a perspective view of the plant package of FIGS. 1, 8 and 9 wherein the upper portion of the sleeve is detached and the remaining lower portion forms a decorative plant cover.

FIG. 11 is a perspective view of another embodiment of a plant package constructed in accordance with the present invention and similar to the plant package shown in FIG. 1, but showing a scalloped design formed by circumferential perforations of the sleeve.

FIG. 12 is a perspective view of the plant package of FIG. 11, having an upper portion of the sleeve removed and a lower portion remaining and forming a decorative plant cover.

FIG. 13 is a perspective view of a sleeve having a circumferential overlapping fold and a closed bottom.

FIG. 14 is a cross-sectional view of the sleeve of FIG. 13, but showing the circumferential overlapping fold and a bonding material connecting at least a portion of the circumferential overlapping fold together.

FIG. 15 is a perspective view of a plant package formed from the sleeve of FIG. 13 and a floral grouping disposed in a flower pot contained in the sleeve, showing an upper portion of the sleeve being detached from a lower portion of the sleeve via both vertical perforations in the upper portion and circumferential perforations.

FIG. 16 is a perspective view of the plant package of FIG. 15 showing the upper portion of the sleeve detached, and showing the remaining lower portion of the sleeve with a skirt attached thereto, the angle of the skirt portion extending downward and outward.

FIG. 29 is a perspective view of the plant package of FIG. 28, but showing the lower portion of the sleeve removed and a portion of the upper portion of the sleeve removed along the decorative perforations, thereby leaving the plurality of decorative sections in the upper portion having a ribbon and bow which form a decorative plant cover.

FIG. 30 is a perspective view of a modified plant package similar to the plant package of FIGS. 22–25, but showing a sleeve having only an upper portion and a ribbon and a pull bow having a pull portion attached to the upper portion of the sleeve, the sleeve disposed about a second decorative plant cover in which a floral grouping disposed in a flower pot is contained.

FIG. 31 is a perspective view of the plant package of FIG. 30, but showing the upper portion of the sleeve being removed, the pull portion of the pull bow acting to cause loops to be formed in the bow section.

FIG. 32 is a perspective view of the plant package of FIG. 31, but showing the upper portion of the sleeve removed, the ribbon remaining disposed about the second decorative plant cover, the pull portion detached and the pull bow formed into a plurality of loops.

DETAILED DESCRIPTION OF THE INVENTION

Description of FIGS. 1–10

Figure 17:
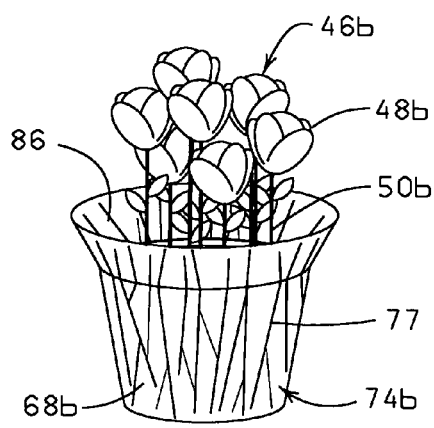
FIG. 17 is a perspective view of the plant package of FIG. 16, but showing the angle of the skirt portion extending upward and outward.

Shown in FIG. 1 and designated therein by the general reference numeral 10 is a plant package. The plant package 10 comprises a sleeve 12 which is generally tubular in shape. The sleeve 12 has a first end 14, a second end 16, an outer peripheral surface 20, an inner peripheral surface 24 and a retaining space 27. In some embodiments (shown in FIGS. 13–17, and discussed in detail below), the second end 16 is closed, thereby forming a closed base of the sleeve 12. Equipment and devices for forming sleeves are commercially available, and well known in the art.

In the formation of the sleeve 12, the outer peripheral surface 20 of the sleeve 12 is continuously sealed from the first end 14 to the second end 16 thereof, thereby providing the sleeve 12 with a generally tubular shape which can be opened to provide the retaining space 27 in which a flower pot may be disposed. This is in contrast to a blank form, such as a flat sheet of material which is supplied to a florist or other retailer or even the consumer. Such a blank requires the florist, retailer or consumer to mold and shape the blank into a form in which a flower pot may be disposed, and may even require that the blank be formed about the flower pot, as the blank is incapable of maintaining such a form or shape. The blank will also require a bonding material, such as an adhesive, a cohesive, tape, slots, grooves, and other like materials, to secure the blank in such form or shape. Therefore, the use of the sleeve 12 which has been preformed into the generally tubular shape sized and dimensioned to contain a flower pot is highly desirable over the blanks which have been previously used.

The plant package 10 may also comprise a flower pot 30 (FIG. 2). The flower pot has an upper end 32, a closed lower end 34, an outer peripheral surface 38, an inner peripheral surface 42 and a pot retaining space 45. The flower pot 30 may be inwardly tapered from the upper end 32 to the closed lower end 34 thereof. The term "flower pot" refers to any type of container used for holding a floral grouping or a potted plant. Examples of flower pots used in accordance with the present invention include clay pots, wooden pots, plastic pots, and the like.

The plant package 10 further comprises a floral grouping 46 (FIGS. 1 and 2). The floral grouping 46 may be disposed in the pot retaining space 45 of the flower pot 30 along with suitable growing medium 47, which will be described in further detail below, or other retaining medium, such as a floral foam. It will also be understood that the floral grouping 46 and any appropriate growing medium 47 or other retaining medium may be disposed in the sleeve 12 without the flower pot 30, and in such embodiment the plant package 10 comprises the sleeve 12 and the floral grouping 46 and any appropriate growing medium 47 or other retaining medium.

The term "floral grouping" as used herein refers to cut fresh flowers, artificial flowers, a single flower or other fresh and/or artificial plants or other floral materials and may include other secondary plants and/or ornamentation or artificial or natural materials which add to the aesthetics of the overall floral grouping 46. The floral grouping 46 comprises a bloom or foliage portion 48 and a stem portion 50. Further, the floral grouping 46 may comprise a growing potted plant having a root portion (not shown) as well. However, it will be appreciated that the floral grouping 46 may consist of only a single bloom or only foliage, or a botanical item (not shown), or a propagule (not shown). The term "floral grouping" may be used interchangeably herein with the terms "floral arrangement" and "potted plant". The term "floral grouping" may also be used interchangeably herein with the terms "botanical item" and/or "propagule."

The term "growing medium" when used herein refers to any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "botanical item" when used herein refers to a natural or artificial herbaceous or woody plant, taken singly or in combination. The term "botanical item" also includes any portion or portions of natural or artificial herbaceous or woody plants including stems, leaves, flowers, blossoms, buds, blooms, cones, or roots, taken singly or in combination, or in groupings of such portions such as a bouquet or a floral grouping.

The term "propagule" when used herein refers to any structure capable of being propagated or acting as an agent of reproduction including seeds, shoots, stems, runners, tubers, plants, leaves, roots or spores.

A bonding material 54 (FIGS. 3–5) may be disposed on at least a portion of the inner peripheral surface 24 of the sleeve 12, as shown in FIG. 3, or, alternatively, the bonding material 54 may be disposed on the outer peripheral surface 38 of the flower pot 30 contained within the sleeve 12, as illustrated in FIG. 4, while the sleeve 12 may be free of the bonding material 54. In a further alternative, the bonding material 54 may be disposed both on at least a portion of the outer peripheral surface 38 of the flower pot 30 as well as upon at least a portion of the inner peripheral surface 24 of the sleeve 12, as shown in FIG. 5. In addition, a portion of the bonding material 54 may also be disposed on the outer peripheral surface 20 of the sleeve 12 as well (not shown). The bonding material 54 may also be disposed upon either the outer peripheral surface 20 or the inner peripheral surface 24 of the sleeve 12, as well as upon the outer peripheral surface 38 of the flower pot 30. It will be understood that the bonding material 54 may be disposed in a solid section of bonding material 54, as shown in FIG. 3 for example. Further, the bonding material 54 may be disposed in strips of bonding material 54, spots of bonding material 54, or in any other geometric, non-geometric, asymmetric, or fanciful form, and in any pattern, including covering either the entire surface of the sleeve 12 and/or the flower pot 30. The bonding material 54 is disposed on the sleeve 12 and/or flower pot 30 by any method known in the art. One method for disposing a bonding material 54, in this case an adhesive, is described in U.S. Pat. No. 5,111,637 entitled "Method For Wrapping A Floral Grouping" issued to Weder et al., on May 12, 1992, which has been incorporated by reference above.

The term "bonding material" when used herein refers to an adhesive, frequently a pressure sensitive adhesive, or a cohesive. Where the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" also includes materials which are sonic sealable and vibratory sealable. The term "bonding material" when used herein also means a heat sealing lacquer or hot melt material which may be applied to the material and, in this instance, heat, sound waves, or vibrations, also must be applied to effect the sealing.

Alternatively, a cold seal using a cold seal adhesive is utilized upon the material to form a sleeve. The term "bonding material" includes this cold seal adhesive. The cold seal adhesive adheres only to a similar substrate, acting similarly as a cohesive, and binds only to itself. The cold seal adhesive, since it adheres (or coheres) only to a similar substrate, does not cause a residue to build up on equipment, thereby permitting much more rapid disposition and use to form articles. A cold seal adhesive differs also from, for example, a pressure sensitive adhesive, in that a cold seal adhesive is not readily releasable.

The term "bonding material" when used herein also includes any heat or chemically shrinkable material, and static electrical or other electrical materials, chemical welding materials, magnetic materials, mechanical or barb-type fastening materials or clamps, curl-type characteristics of the film or materials incorporated in material which can cause the material to take on certain shapes, cling films, slots, grooves, shrinkable materials and bands, curl materials, springs, and any type of welding method which may weld portions of the material to itself or to the flower pot, or to both the material itself and the flower pot.

The sleeve 12 is generally tubularly shaped, but the sleeve 12 may be cylindrical, frusto-conical, or a combination of both frusto-conical and cylindrical (not shown). Further, as long as a generally tubular shape is maintained in at least a portion of the sleeve 12, any shape, whether geometric, non-geometric, asymmetrical and/or fanciful may be utilized. The sleeve 12 may also be equipped with drains or ventilation holes (not shown), or can be made from permeable or impermeable materials.

The sleeve 12 has a thickness in a range from about 0.1 mil to about 30 mil. Often, the thickness of the sleeve 12 is in a range from about 0.5 mil to about 10 mil. Preferably, the sleeve 12 has a thickness in a range from about 0.1 mil to about 5 mil. The sleeve 12 is constructed of a material 56 which is flexible.

The sleeve 12 may be constructed of a single layer of material or a plurality of layers of the same or different types of materials. Any thickness of layer of material may be utilized to construct the sleeve 12 in accordance with the present invention as long as the sleeve 12 may be formed into at least a portion of a sleeve 12, as described herein, and as long as the formed sleeve 12 may contain at least a portion of the flower pot 30 or the floral grouping 46, as described herein. Additionally, an insulating material such as bubble film, preferable as one of two or more layers, can be utilized in order to provide additional protection for the item, such as the floral grouping 46, contained therein. The layers of material comprising the sleeve 12 may be connected together or laminated or may be separate layers. Materials which may be utilized for construction of the sleeve 12 are described in U.S. Pat. No. 5,111,637 entitled "Method For Wrapping A Floral Grouping" issued to Weder et al., on May 12, 1992, which is hereby expressly incorporated herein by reference.

In one embodiment, the sleeve 12 may be constructed from two polypropylene films. The two polypropylene films comprising the sleeve 12 may be-connected together or laminated or may remain separate layers. In an alternative embodiment, the sleeve 12 may be constructed from only one of the polypropylene films.

The sleeve 12 may also be constructed, in whole or in part, from a cling material. "Cling Wrap or Material" when used herein refers to any material which is capable of connecting to the flower pot 30 and/or floral grouping 46 and/or itself upon contacting engagement during the wrapping process and is wrappable about an item whereby portions of the cling material contactingly engage and connect to other portions of another material, or, alternatively, itself, for generally securing the sleeve 12 wrapped about at least a portion of the flower pot 30 or the floral grouping 46. This connecting engagement is preferably temporary in that the material may be easily removed, i.e., the cling material "clings" to the flower pot 30.

The cling material is constructed from polyethylene such as Cling Wrap made by Glad®, First Brands Corporation, Danbury, Conn., and may be treated if necessary. The thickness of the cling material will, in part, depend upon the size of the sleeve 12 and the flower pot 30 in the plant package 10, i.e., generally, when the flower pot 30 is large, a thicker and therefore stronger cling material may be required. The cling material will range in thickness from less than about 0.1 mil to about 10 mil, and preferably less than about 0.5 mil to about 2.5 mil and most preferably from less than about 0.6 mil to about 2 mil. However, any thickness of cling material may be utilized in accordance with the present invention which permits the cling material to function as described herein.

The sleeve 12 is constructed from any suitable material (said material shown only in the form of a sleeve 12, but the material having an upper surface, a lower surface, and an outer periphery) that is capable of being wrapped about the flower pot 30 or the floral grouping 46, and formed into a plant package 10 as described herein. Preferably, the material from which the sleeve 12 is constructed is selected from the group consisting of paper, metal foil, polymeric film, fabric (woven, nonwoven, synthetic or natural), cardboard, fiber, cloth, burlap, and laminations and combinations thereof.

The term "polymeric film" refers to a synthetic polymer such as a polypropylene or a naturally occurring polymer such as cellophane. A polymeric film is relatively strong and not as subject to tearing (substantially non-tearable), as might be the case with paper or foil.

The material from which the sleeve 12 is constructed may vary in color. Further, the material from which the sleeve 12 is constructed may consist of designs or decorative patterns which are printed, etched, and/or embossed thereon using inks or other printing materials. An example of an ink which may be applied to the surface of the material from which the sleeve 12 is constructed is described in U.S. Pat. No. 5,147,706 entitled "Water Based Ink On Foil And/Or Synthetic Organic Polymer" issued to Kingman on Sep. 15, 1992 and which is hereby incorporated herein by reference.

In addition, the material from which the sleeve 12 is constructed may have various colorings, coatings, flocking and/or metallic finishes, or other decorative surface ornamentation applied separately or simultaneously or may be characterized totally or partially by pearlescent, translucent, transparent, iridescent or the like, qualities. Each of the above-named characteristics may occur alone or in combination and may be applied to the upper and/or lower surface of the material from which the sleeve 12 is constructed. Moreover, each surface of the material used in constructing the sleeve 12 may vary in the combination of such characteristics. The material utilized for the sleeve 12 may be opaque, translucent, transparent, or partially clear or tinted transparent.

The sleeve 12 may further comprise an extension 58, as shown in FIGS. 6 and 7. The extension 58 has a plurality of perforations 60 (the plurality of perforations designated generally by the numeral 60) in the sleeve 12 adjacent to the first end 14 thereof. The extension 58 has one or more apertures 62 (only one aperture designated by the numeral 62) disposed therein. The apertures 62 permit the sleeve 12, or a complete plant package 10, to be placed on a rod or a set of rods 64 (FIG. 7), also known as wickets, for shipment, storage, assembly of the plant package 10, or other function known in the art.

The sleeve 12 further has an upper portion 66 and a lower portion 68 (FIGS. 1 and 3–9). The lower portion 68 of the sleeve 12 is sized, shaped and dimensioned such that, upon positioning the flower pot 30 in the sleeve 12, the lower portion 68 of the sleeve 12 is tapered to substantially correspond in shape to the inwardly taper of the outer peripheral surface 38 of the flower pot 30, as shown in FIGS. 3–5. The sleeve 12 also has detaching elements in preselected areas. "Detaching element," as used herein, refers to any element, or combination of elements, or features, such as perforations, tear strips, zippers, and any other devices or elements of this nature known in the art, or any combination thereof. Therefore, while perforations are shown and described in detail herein, it will be understood that tear strips, zippers, or any other "detaching elements" known in the art, or any combination thereof, could be substituted therefor and/or used therewith. A plurality of generally circumferential perforations 70 (FIGS. 1 and 6–9) are disposed circumferentially about the sleeve 12 and delineate the upper portion 66 of the sleeve 12 from the lower portion 68 of the sleeve 12. The upper portion 66 of the sleeve 12 has a plurality of vertical perforations 72 (FIGS. 1 and 6–9) which are disposed in a vertical line in the upper portion 66 of the sleeve 12, generally extending between the circumferential perforations 70 and the first end 14 of the sleeve 12. The upper portion 66 of the sleeve 12 is separable from the lower portion 68 by tearing the upper portion 66 along both the vertical perforations 72 and the circumferential perforations 70, thereby detaching the upper portion 66 of the sleeve 12 from the lower portion 68 of the sleeve 12. As shown in FIG. 10, the remaining lower portion 68 of the sleeve 12 is disposed about the flower pot 30 and/or the floral grouping 46 (and/or the growing medium 47), thereby forming a decorative plant cover 74 which substantially surrounds and encompasses the flower pot 30 and/or the growing medium 47 or other retaining medium (not shown) in which the floral grouping 46 is disposed. A portion of the lower portion 68 of the sleeve 12 extends a distance above the upper end 32 of the flower pot 30, thereby forming a decorative skirt portion 73 of the decorative plant cover 74. The decorative skirt portion 73 is provided with an upper edge 75. The decorative skirt portion 73 is disposed adjacent only a lower portion of the floral grouping 46 disposed in the flower pot 30, such as a portion of the stem portion 50 of the floral grouping 46, substantially as shown in FIG. 10, so that the distance between the upper end 32 of the flower pot 30 and the upper edge 75 of the decorative skirt portion 73 is less than the distance between the closed lower end 34 of the flower pot 30 and the upper end 32 of the flower pot 30.

It will be understood that the decorative plant cover 74, and/or the second decorative cover described in detail below may be provided with all of the characteristics of the flower pot 30. That is, the decorative plant cover 74 (or the second decorative cover) may comprise both the decorative characteristics of a decorative cover as well as the structural characteristics of a pot (not shown), namely, the decorative plant cover 74 (and the second decorative cover, described in detail below) may have an upper end, a lower end, an outer peripheral surface, an inner peripheral surface and a retaining space.

In a general method of use (FIGS. 1–2 and 8–10), an operator provides the sleeve 12 and the flower pot 30 having the floral grouping 46 disposed in the growing medium 47 contained within the flower pot 30. The operator then opens the sleeve 12 at the first end 14 thereof and assures that the sleeve 12 is somewhat expanded outward to form the retaining space 27. The operator then disposes the flower pot 30 having the floral grouping 46 therein into the retaining space 27 of the sleeve 12, the flower pot 30 being disposed generally through the upper portion 66 of the sleeve 12 into generally the lower portion 68 of the sleeve 12, the flower pot 30 remaining in the lower portion 68 of the sleeve 12, permitting the sleeve 12 to substantially surround and tightly encompass the flower pot 30. It will be understood that alternatively, the sleeve 12 with an extension 58, as shown schematically in FIGS. 6–7, may be utilized, and the flower pot 30 then being disposed in the sleeve 12 either before or after the rods 64 are disposed through the extension 58 of the sleeve 12.

Alternatively, the flower pot 30 could be placed on a support device such as a pedestal (not shown), and the sleeve 12 disposed underneath or astride the flower pot 30 could be pulled toward and over the flower pot 30 so as to substantially surround the flower pot 30 or at least a portion of the outer peripheral surface 38 of the flower pot 30. The bonding material 54 disposed on the flower pot 30 and/or the sleeve 12 (FIGS. 3–5) could then serve to connect the sleeve 12 to the flower pot 30.

The floral grouping 46 extends from the growing medium 47 in the retaining space 45 of the flower pot 30 (FIG. 2) and into the upper portion 66 of the sleeve 12 (FIGS. 1, 8 and 9). The material from which the sleeve 12 is constructed has sufficient flexibility but also sufficient rigidity to both remain in and sustain the generally tubular or frusto-conical shape of the sleeve 12, thereby substantially surrounding and encompassing the floral grouping 46, particularly the stem portion 50 and the bloom portion 48 of the floral grouping 46. When the flower pot 30 is disposed adjacent the inner peripheral surface 24 of the sleeve 12 in the lower portion 68 of the sleeve 12, the bonding material 54 disposed on the inner peripheral surface 24 of the sleeve 12 and/or the outer peripheral surface 38 of the flower pot 30 connects the sleeve 12 and the flower pot 30 together, thereby securely bonding the sleeve 12 to the flower pot 30, and/or the flower pot 30 to the sleeve 12, depending upon the disposition of the bonding material 54, as shown in FIGS. 3–5 and described in detail previously.

To remove the upper portion 66 of the sleeve 12, the operator generally grasps the sleeve 12 near the vertical perforations 72 and adjacent the first end 14 of the sleeve 12 and pulls one side of the upper portion 66 of the sleeve 12 away from the line of vertical perforations 72 and downward, thereby causing the sleeve 12 to tear away along the vertical perforations 72, as shown in FIGS. 8–9. When the sleeve 12 has separated along the vertical perforations 72 from the first end 14 thereof to the circumferential perforations 70, the operator then pulls the detached portion of the sleeve 12 circumferentially about the flower pot 30, as illustrated in FIG. 9, thereby causing the sleeve 12 to tear or separate along the line of circumferential perforations 70. The upper portion 66 of the sleeve 12 is then discarded, leaving the lower portion 68 of the sleeve 12 which forms the decorative plant cover 74 disposed about the flower pot 30; and which is at least partially bondingly connected to the flower pot 30 (FIG. 10). The lower portion 68 of the sleeve 12 which remains about the flower pot 30 may be equipped with a reservoir (not shown) to contain water, nutrients, preservatives, and/or hormones for nourishing the plant and/or floral grouping 46 after the upper portion 66 of the sleeve 12 has been removed.

Description of FIGS. 11–12

FIGS. 11–12 illustrate another embodiment and method of use of the present invention. A plant package 10a comprises a sleeve 12a, a flower pot 30a and a floral grouping 46a disposed in the flower pot 30a, and the plant package 10a is constructed and utilized similar to the plant package 10 shown in FIGS. 1 and 3–10 and described in detail previously, except as described herein below. The sleeve 12a is provided with an upper portion 66a which is detachable from a lower portion 68a thereof via circumferential perforations 70a and vertical perforations 72a. The sleeve 12a is constructed so that the circumferential perforations 70a form a decorative design, namely, a scalloped design, as shown in FIGS. 11–12.

The flower pot 30a containing the floral grouping 46a may be disposed in the sleeve 12a as described hereinabove or by any method known in the art. When the upper portion 66a of the sleeve 12a is removed by any method described herein or any method known in the art, the remaining lower portion 68a of the sleeve 12a forms a decorative plant cover 74a having a decorative skirt portion 73a comprising a plurality of curved portions 76 and having a scalloped upper edge 75a. It will be appreciated that the circumferential perforations 70a may form any decorative design or combination of decorative designs on the upper edge 75a of the decorative skirt portion 73a. It will also be appreciated that additional decorative designs created by the vertical perforations 72a and/or the circumferential perforations 70a will suggest themselves when the plant package 10a is utilized by those having ordinary skill in the art, and therefore the invention is not limited to the decorative designs described herein or depicted in the figures.

Description of FIGS. 13–17

FIGS. 13–17 illustrate another embodiment and method of use of the present invention. FIG. 15 illustrates a plant package 10b which is constructed similar to the plant package 10 shown in FIGS. 1 and 3–10 and described in detail previously, except as described herein below. The plant package 10b comprises a sleeve 12b, a flower pot 30b and a floral grouping 46b having a bloom portion 48b and a stem portion 50b, wherein the floral grouping 46b is disposed in the flower pot 30b. The plant package 10b may further include a growing medium 47b disposed in the flower pot 30b (FIGS. 15 and 16).

As illustrated in FIGS. 13 and 14, the sleeve 12b has a first end 14b, a second end 16b, an outer peripheral surface 20b, an inner peripheral surface 24b, and a retaining space 27b. The second end 16b of the sleeve 12b is closed, thereby forming a base 28. The sleeve 12b is also provided with an upper portion 66b which is detachable from a lower portion 68b of the sleeve 12b via circumferential perforations 70b and vertical perforations 72b. The sleeve 12b is constructed from a sheet of material which is similar to the material utilized in construction of the sleeve 12, as described in detail hereinbefore. Such a sheet of material is disclosed and described in U.S. Pat. No. 5,111,638 entitled "Method For Wrapping A Floral Grouping" issued to Weder et al., on May 12, 1992, which has been previously incorporated by reference herein. In addition, the sleeve 12b has a plurality of overlapping folds 77 which are formed by the use of a bonding material 79 on the material from which the sleeve 12b is formed (the bonding material 79 being similar to the bonding material 54 described hereinbefore), by the use of heat shrinkable material known in the art and commercially available, or by any device or mechanical methods which forms sheet material into such a shape. Such mechanical methods are disclosed in U.S. Pat. No. 4,773,182, entitled, "Article Forming System"; U.S. Pat. No. 4,897,031, entitled, "Article Forming System"; U.S. Pat. No. 5,208, 027, entitled "Article Forming System"; and U.S. Pat. No. 5,307,606, entitled "Covering for Flower Pot and Floral Grouping", all of which are hereby expressly incorporated by reference herein.

Alternatively, the sheet of material from which the sleeve 12b is constructed may be folded in such a manner as to form gussets in the sleeve 12b. Methods of forming gussets in sheet material, and folding sheet material, are known to those having ordinary skill in the art.

The sleeve 12b also differs from the sleeve 12 in that the sleeve 12b has a circumferential overlapping fold 78 which extends circumferentially about the sleeve 12b, as shown in FIG. 14. In this embodiment, the bonding material 79 is disposed generally both above and near the circumferential perforations 70b and below and near the circumferential perforations 70b (FIGS. 13 and 15. The bonding material 79 extends about the sleeve 12b in generally parallel alignment with the circumferential perforations 70b. The circumferential overlapping fold 78 is formed in this area. That is, a portion of the outer peripheral surface 20b of the sleeve 12b extending circumferentially around the sleeve 12b, near the circumferential perforations 70b, is folded under by tucking a portion of the outer peripheral surface 20b of the sleeve 12b (near the line of circumferential perforations 70a) under, thereby causing a portion of the inner peripheral surface 24b of the sleeve 12b to lie adjacent another portion of the inner peripheral surface 24b of the sleeve 12b (as shown schematically in FIG. 14), creating a first fold 80. This first fold 80 causes a first portion 82 of the outer peripheral surface 20b of the sleeve 12b having the bonding material 79 thereon to overlap and lie adjacent a second portion 84 of the outer peripheral surface 20b of the sleeve 12b, the second portion 84 of the outer peripheral surface 20b also having the bonding material 79 thereon. The first portion 82 contacts the second portion 84, and the first and second portions 82 and 84 respectively, are bondingly connected, as shown schematically in FIG. 14 (it will be appreciated that the connection between the first portion 82 and the second portion 84 will likely be much closer than the connection schematically shown in FIG. 14). In this manner, the three-layer circumferential overlapping fold 78 is created in the sleeve 12b. The circumferential fold 78 remains in place until the upper portion 66b of the sleeve 12b is removed as described herein.

In a general method of use as shown in FIG. 15, the flower pot 30b containing the floral grouping 46b is disposed into the sleeve 12b such that the flower pot 30b is closely surrounded and encompassed by the lower portion 68b of the sleeve 12b, and at least a portion of the floral grouping 46b is disposed in the upper portion 66b of the sleeve 12b. When the upper portion 66b of the sleeve 12b is removed as shown and described in detail previously herein, the remaining portion of the circumferential overlapping fold 78 forms a skirt portion 86 which extends about, and outwardly from, an opening 88 in the lower portion 68b of the resulting decorative plant cover 74b as shown in FIGS. 16 and 17, and may surround and encompass at least a portion of the stem portion 50b of the floral grouping 46b, depending on the position of the skirt portion 86. The position of the skirt portion 86 may be altered by an operator by releasing the bonding material 54b connecting both the first portion 82 and the second portion 84 of the outer peripheral surface 20b of the sleeve 12b from its bonded position. The skirt portion 86 may be formed so as to turn upwardly, inwardly, horizontally (upward or inward), downwardly, vertically (either upward or downward) or in any combination thereof, or in any obtuse or arbitrary angle or combination thereof.

To alter the position of the skirt portion 86, an operator simply pulls the first portion 82 away from the second portion 84 of the outer peripheral surface 20b of the sleeve 12b. Then, the skirt portion 86 may be arranged at different angles, such as the angle shown in FIG. 16, with the skirt portion 86 extending downwardly and outwardly, or such as the angle shown in FIG. 17, in which the skirt portion 86 extends upwardly and outwardly. It will be appreciated that a variety of skirt portion angles may be created, such as a horizontally extending skirt portion 86, or an upwardly and inwardly extending skirt portion 86. It will further be understood by one having ordinary skill in the art that the circumferential overlapping fold 78 permits the formation of such a skirt portion 86 having a flare, as shown in FIGS. 16 and 17. Further, the circumferential overlapping fold 78 protects the skirt portion 86 from being crushed or damaged before the upper portion 66b of the sleeve 12b is removed. Then, once the upper portion 66b is removed as described above, the operator may flare the skirt portion 86 as desired. It will be further appreciated that the circumferential overlapping fold 78 may overlap inward, toward the floral grouping 46b, rather than outward, as presently shown in FIGS. 13–15. In a further alternative, a skirt portion 86 may be formed without any circumferential overlapping fold 78.

Description of FIGS. 18–21

Figure 18:
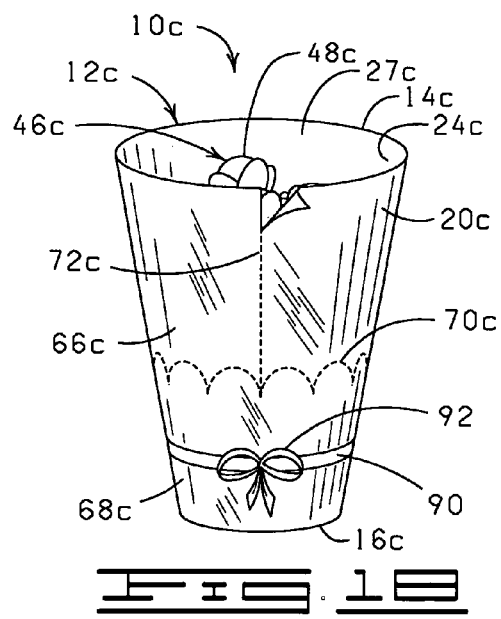
FIG. 18 is a perspective view of a modified plant package similar to the plant package of FIGS. 11 and 12 but having a scalloped design along circumferential perforations of the sleeve, and showing a ribbon having a bow, the ribbon extending around the sleeve.
Figure 19:
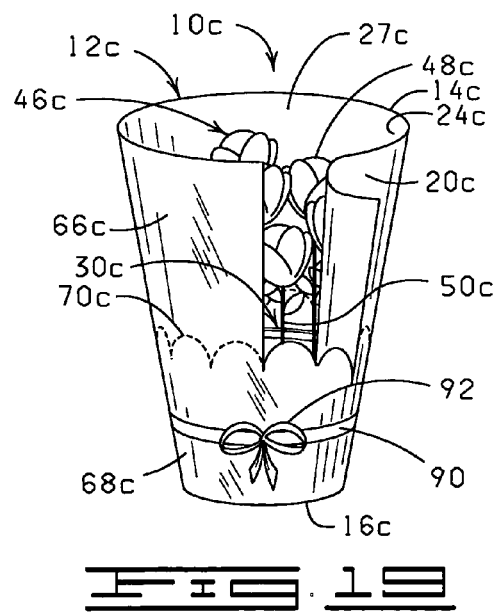
FIG. 19 is a perspective view of the plant package of FIG. 18, but showing an upper portion of the sleeve being detached from a lower portion thereof via vertical perforations and circumferential perforations.

FIGS. 18–19 illustrate another embodiment and method of use of the present invention. A plant package 10c illustrated in this embodiment and used in this method is similar to the plant package 10 shown in FIGS. 1, 8 and 9 and described in detail previously, except as described herein below.

The plant package 10c comprises a sleeve 12c, a flower pot 30c and a floral grouping 46c having a bloom portion 48c and a stem portion 50c and being disposed in the flower pot 30c. The plant package 10c may further comprise a growing medium 47c. The sleeve 12c has a first end 14c, a second end 16c, an outer peripheral surface 20c, an inner peripheral surface 24c, and a retaining space 27c. The sleeve 12c is also provided with an upper portion 66c which is detachable from a lower portion 68c thereof via circumferential perforations 70c and vertical perforations 72c (FIG. 18).

The sleeve 12c has printed thereupon both a ribbon pattern 90 and a bow pattern 92, said ribbon pattern 90 extending about the outer peripheral surface 20c of the sleeve 12c, in the lower portion 68c of the sleeve 12c. Alternatively, an actual bow may be attached to the ribbon 90 via a bonding material, rather than being printed upon the sleeve 12c as a bow pattern 92.

Figure 20:
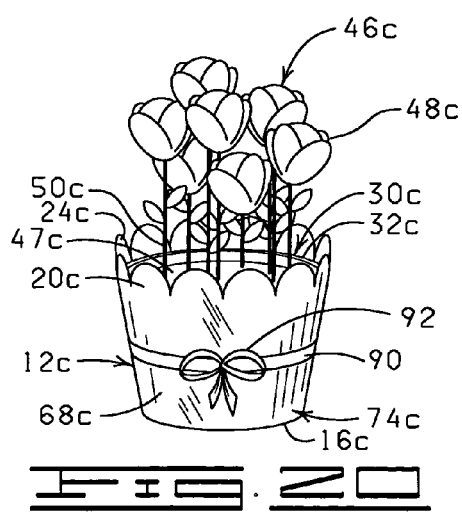
FIG. 20 is a perspective view of the plant package of FIG. 19, but showing the upper portion of the sleeve detached and showing the remaining lower portion of the sleeve forming a decorative plant cover with a scalloped edge.

In a method of use, the upper portion 66c of the sleeve 12c is removed as shown in FIGS. 18 and 19 or by any method described herein to provide a decorative plant cover 74c having the appearance of a ribbon 90 wrapped about and encircling the decorative plant cover 74c, the ribbon 90 being decoratively tied into a bow 92, as shown in FIG. 20.

In a further alternative, the sleeve 12c is constructed from more than one material, so that the ribbon pattern 90 forms an integral part of the sleeve 12c but is constructed of a material different from the material of the remainder of the sleeve 12c, such as, but not by way of limitation, heat shrinkable material, as described previously. Such ribbon pattern 90 may be shrunk to cause a crimping condition of a portion of the decorative plant cover 74c (FIG. 21) as described above, or may remain unshrunk, as shown in FIG. 20.

Figure 21:
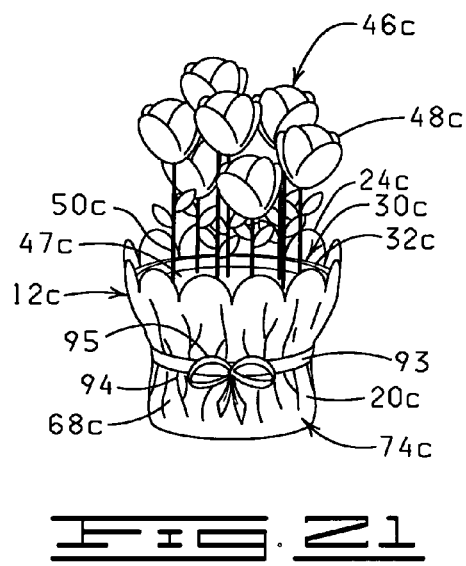
FIG. 21 is a perspective view of the plant package of FIG. 20, but showing the decorative plant cover crimped by the ribbon which extends about the sleeve.

FIG. 21 illustrates another embodiment and method of use of the present invention. The sleeve 12c has an actual ribbon 93 which extends circumferentially around the outer peripheral surface 20c of the sleeve 12c in the lower portion 68c of the sleeve 12c, and an actual bow 95 is attached to the ribbon 90 or formed from the ends of the ribbon 93. The ribbon 93 and bow 95 may be connected to the sleeve 12c via a bonding material (not shown) or may be tied about the sleeve 12c and flower pot 30c to sufficiently hold the ribbon 93 and bow 95 (as well as the sleeve 12c) thereabout. The ribbon 93 and/or bow 95 may be constructed from any material described herein or known in the art.

In a method of use, the ribbon 93 is connected to the sleeve 12c via a bonding material in a manner which crimps the sleeve 12c somewhat in and near the ribbon 93. Crimping sheet material is well known in the art. For example, the ribbon 93 may comprise a heat shrinkable material (known in the art and commercially available), and the ribbon 93 may be placed in a condition to crimp the lower portion 68c of the sleeve 12c by exposing the ribbon 93 (either before or after the upper portion 66c of the sleeve 12c is removed) to a heat source sufficient to cause the ribbon 93 to shrink and thereby crimp the lower portion 68c of the sleeve 12c (such heat sources are known in the art and commercially available, such as a heat gun which blows heated air). The upper portion 66c of the sleeve 12c is removed by any method described herein, leaving the lower portion 68c of the sleeve 12c which forms the decorative plant cover 74c, and the ribbon 93 which crimps the decorative plant cover 74c about the flower pot 30c or the floral grouping 46c (or growing medium 47c), the ribbon 93 being tied into a bow 95, or a separate bow 95 being connected in any manner described herein to the ribbon 93 and/or the decorative plant cover 74c. It will be appreciated that the ribbon 93 and/or bow 95 may be connected at any level of the flower pot 30c, or above the flower pot 30c, thereby crimping the decorative plant cover 74c inward in a diameter smaller than the diameter of an upper end 32c of the flower pot 30c, or, alternatively, connecting the ribbon 93 and/or bow 95 at any level of the decorative plant cover 74c which encompasses the flower pot 30c. Alternatively, the ribbon 93 and/or bow 95 is connected to the sleeve 12c without crimping, as shown in FIG. 20 and described previously.

After a flower pot 30c has been disposed in the sleeve 12c by any method described herein, a crimped portion 94 is formed by the ribbon 93 (FIG. 21), the crimped portion 94 causing adjacent portions of the inner peripheral surface 24c and/or outer peripheral surface 20c of the lower portion 68c of the sleeve 12c to come together, the bonding material on the ribbon 93 and/or sleeve 12c causing adjacent portions to be bonded together for forming the crimped portion 94. Crimping may be accomplished by hand or with a device or a machine as may be desired in a particular application. The crimped portion 94 may comprise only adjacent portions of the lower portion 68c of the sleeve 12c, or, alternatively, the crimped portion 94 of the lower portion 68c of the sleeve 12c may engage a portion of the flower pot 30c, the flower pot 30c having a bonding material on the outer peripheral surface 38c thereof, wherein the bonding material on the flower pot 30c creates the crimped portion 94. Alternatively, the crimped portion 94 of the lower portion 68c of the sleeve 12c may be created by any combination of the lower portion 68c of the sleeve 12c and/or the outer peripheral surface 38c of the flower pot 30c and/or the ribbon 93 which extends about the lower portion 68c of the sleeve 12c, by hand or by any device or mechanical methods known in the art. The crimped portion 94 engages a portion of the flower pot 30c for cooperating to maintain the lower portion 68c of the sleeve 12c assembled about and/or connected to the flower pot 30c.

The crimped portion 94 (FIG. 21) preferably extends circumferentially about the outer peripheral surface 38c of the flower pot 30c and/or a portion of the floral grouping 46c and/or growing medium 47c. In some applications, it may be desirable to form the crimped portion 94 only at certain positions spaced circumferentially about the lower portion 68c of the sleeve 12c. Methods of crimping are also shown in U.S. Pat. No. 5,809,629, entitled "Method and Apparatus For Forming a Decorative Cover"; U.S. Pat. No. 5,361,482, entitled, "Method of Forming A Flower Pot Cover With Crimped Portion"; and U.S. Pat. No. 5,428,939, entitled, "Method For Crimping A Wrapper About a Floral Grouping", all of which are hereby specifically incorporated by reference herein.

Further, it will be appreciated that any ribbon 93 shown and/or described herein may comprise a band. The term "band" when used herein refers to any material which may be secured about an object such as a flower pot or a sleeve, such bands commonly being referred to as elastic bands, rubber bands or non-elastic bands and also includes any other type of material such as an elastic or non-elastic string or elastic piece of material, non-elastic piece of material, a round piece of material, a flat piece of material, a ribbon, a piece of paper strip, a piece of plastic strip, a piece of wire, a tie wrap or a twist tie or combinations thereof or-any other device capable of gathering material to removably or substantially permanently form a crimped portion and secure the crimped portion formed in the material which may be secured about an object such as the flower pot. The band also may include a bow 95 if desired in a particular application.

The crimped portion 94 may be formed either before or after the removable upper portion 66c of the sleeve 12c has been detached from the remaining lower portion 68c (not shown). After the upper portion 66c of the sleeve 12c has been removed, the remaining lower portion 68c of the sleeve 12c now constitutes a decorative plant cover 74c. The decorative plant cover 74c may be removable from the flower pot 30c, or may be firmly connected to the outer peripheral surface 38c of the flower pot 30c by a bonding material disposed, as noted above, either on the outer peripheral surface 38c of the flower pot 30c or on the inner peripheral surface 24c of the sleeve 12c.

It will also be understood by one of ordinary skill in the art that the sleeve 12c may have a portion which forms a skirt portion 86c, such that when the removable upper portion 66c of the sleeve 12c is detached, a decorative plant cover 74c with a skirt portion 86c remains, as described in detail hereinbefore with reference to the skirt portion 86 of the decorative plant cover 74b.

Description of FIGS. 22–29

Figure 22:
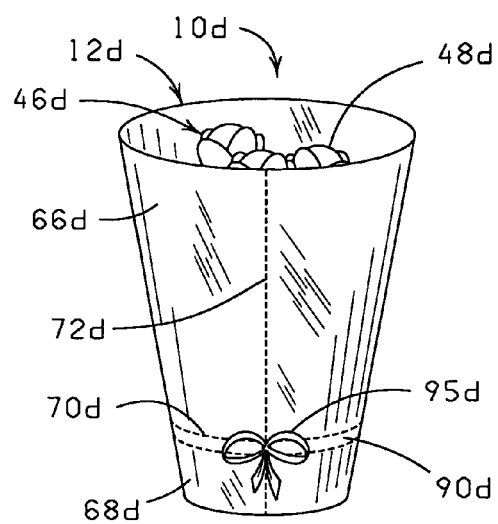
FIG. 22 is a perspective view of yet another embodiment of a plant package constructed in accordance with the present invention and similar to the plant package shown in FIG. 1, but showing a sleeve having vertical perforations extending through both an upper portion and a lower portion of the sleeve, and having two parallel circumferential perforations which form a ribbon appearance thereabout with a bow, and further having a second decorative plant cover enclosed within the sleeve.
Figure 23:
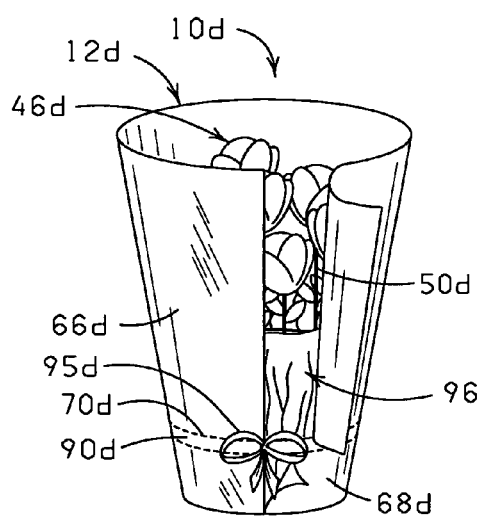
FIG. 23 is a perspective view of the plant package of FIG. 22, but showing both the upper portion and the lower portion of the sleeve being removed, the ribbon and bow remaining disposed about the second decorative plant cover.
Figure 26:
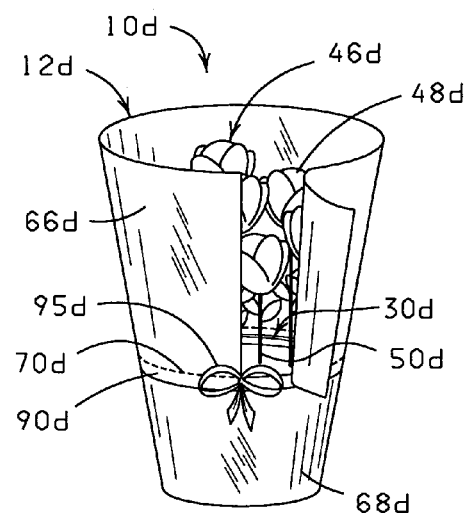
FIG. 26 is a perspective view of a modified plant package similar to the plant package shown in FIG. 22, but showing a sleeve having vertical perforations which only extend through an upper portion thereof and only one circumferential perforation extending about the sleeve, the upper portion shown as partially detached from a lower portion of the sleeve.

FIGS. 22, 23 and 26 illustrate another embodiment and method of use of the present invention. A plant package 10d illustrated in this embodiment and used in this method is constructed similar to the plant package 10c shown in FIGS. 18–19 and described in detail previously, except as described hereinbelow. The plant package 10d comprises a sleeve 12d, a flower pot 30d (FIGS. 26 and 27) and a floral grouping 46d having a bloom portion 48d and a stem portion 50d and being disposed in the flower pot 30d. The sleeve 12d is provided with an upper portion 66d which is detachable from a lower portion 68d via circumferential perforations 70d and vertical perforations 72d.

As shown in FIGS. 22–23, the vertical perforations 72d of the sleeve 12c of the plant package 10d extend below the circumferential perforations 70d into the lower portion 68d of the sleeve 12d. An underlying second decorative plant cover 96 (identical to the previously described decorative plant cover 74 or, alternatively, either a flower pot cover known in the art, or, in a further alternative, the flower pot 30d) is contained within the sleeve 12d, and the circumferential perforations 70d comprise two parallel lines of circumferential perforations 70d (only one line of circumferential perforations designated by the numeral 70d). A ribbon pattern 90d and bow 95d are utilized in this embodiment and method, and may comprise any ribbon pattern 90d and/or bow 95d shown and/or described herein, or known in the art.

Figure 24:
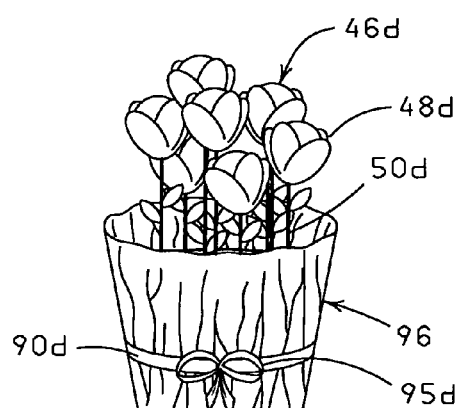
FIG. 24 is a perspective view of the plant package of FIG. 23, but showing both the upper portion and the lower portion of the sleeve removed, the ribbon and bow remaining disposed about the second decorative plant cover.
Figure 25:
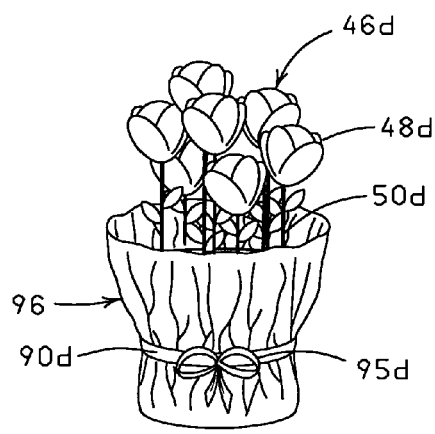
FIG. 25 is a perspective view of the plant package of FIG. 22, but showing both the upper portion and the lower portion of the sleeve removed, the remaining ribbon and bow extending about and crimping the remaining second decorative plant cover.

The sleeve 12d may be completely removed, except for the ribbon pattern 90d and bow 95d. The ribbon pattern 90d may extend about the second decorative plant cover 96 in a non-crimped condition, as shown in FIG. 24. Alternatively, the ribbon pattern 90d may extend about the second decorative plant cover 96 in a crimped condition, as shown in FIG. 25, and as previously described herein with reference to the ribbon 93 extending about the crimped decorative plant cover 74c of FIG. 21.

Figure 27:
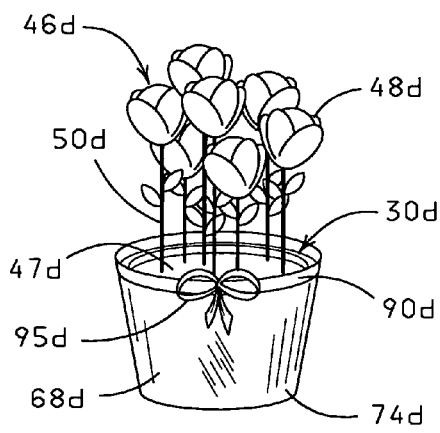
FIG. 27 is a perspective view of the plant package of FIG. 26, but showing the upper portion of the sleeve removed, the lower portion of the sleeve forming a decorative plant cover having a bow with a ribbon extending thereabout.
Figure 28:
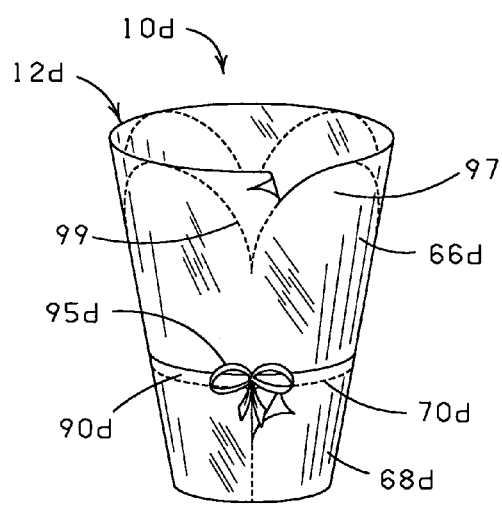
FIG. 28 is a perspective view of a modified plant package similar to the plant package shown in FIG. 22, but showing a sleeve having a plurality of decorative perforations defining a plurality of decorative sections in an upper portion of the sleeve, the upper portion having no vertical perforation and only a single circumferential perforation, a lower portion of the sleeve having a vertical perforation shown partially detached, and with one of the plurality of decorative perforations shown as partially detached as well.

Alternatively, as shown in FIGS. 26 and 27, the upper portion 66d of the sleeve 12d may be removed by any method described herein, and the lower portion 68d of the sleeve 12d may remain about at least a portion of the second plant cover 96 (not shown) or the flower pot 30d as a decorative plant cover 74d. In a further alternative, as shown in FIGS. 28 and 29, the lower portion 68d of the sleeve 12d is removed while the upper portion 66d remains in place, forming a skirt portion 86d. The upper portion 66d comprises a plurality of decorative sections 97 (only one section designated 97) defined by a plurality of decorative perforations 99 (only one perforation designated 99). The decorative perforations 99 are torn away in a method previously described herein and known in the art, leaving the decorative sections 97 in the upper portion 66d of the sleeve 12d.

Description of FIGS. 30–32

FIGS. 30–32 illustrate another embodiment and method of use of the present invention. The plant package 10e illustrated in this embodiment and used in this method is constructed similar to the plant package 10d shown in FIGS. 22–29 and described in detail previously, except that a sleeve 12e of the plant package 10e comprises only an upper portion 66e, a ribbon 90e and a pull bow 98 having a pull portion 100 attached to the upper portion 66e of the sleeve 12e, so that when the sleeve 12e is removed, the pull portion 100 pulls the pull bow 98 into a plurality of decorative loops (shown schematically using four loops shown in FIG. 32). The pull portion 100 is detachable from the pull bow 98 once the pull bow 98 is formed into the plurality of loops. The ribbon 90e may comprise any ribbon shown and/or described herein.

In a method of use, the upper portion 66e of the sleeve 12e is detached by any method described herein. The pull portion 100 causes ribbon within the pull bow 98 to gather into the plurality of decorative loops, the beginning of this operation being shown in FIG. 31, as the upper portion 66e of the sleeve 12e is pulled away. The pull portion 100 is detached from the pull bow 98 by any method known by those having ordinary skill in the art, leaving a decorative plant cover 96e having a ribbon 90e extending thereabout, and having a multiple loop pull bow 98, as illustrated in FIG. 32. It will be appreciated that the ribbon 90e may crimp the decorative plant cover 96e, as previously described herein. Further, it will be appreciated that the ribbon 90e and/or pull bow 98 may be utilized with any embodiment shown and/or described herein. As shown in FIGS. 30–32, the plant package 10e comprises a flower pot 30e, the decorative plant cover 96e which is disposed about the flower pot 30e, and the sleeve 12e. It will be understood by a person of ordinary skill in the art that the decorative plant cover 96e shown in FIGS. 30–32 is only one of a number of versions of plant covers which may be employed in the invention described herein. In particular, the decorative plant cover 96e may be formed from a sheet of material which is formed into a cover about the outer peripheral surface (not shown) of the flower pot 30e either by hand or automatically, as previously described herein. The decorative plant cover 96e may or may not further comprise a skirt portion. The decorative plant cover 96e may be a preformed plant cover such as one produced by the method described in U.S. Pat. No. 4,773,182, which has previously been incorporated by reference above. The decorative plant cover 96e may have a plurality of overlapping folds 101 as indicated in FIGS. 30–32. Alternatively, the body of the decorative plant cover 96e may be substantially free of overlapping folds and may have the appearance of a sleeve. A bottom 102 of the decorative plant cover 96e may be flattened, gussetted, or simply sealed along an edge.

The decorative plant cover 96e may have a bonding material (not shown) disposed upon a portion thereof, including an inner peripheral surface and/or an outer peripheral surface thereof, for attaching to the flower pot 30e and/or to the sleeve 12e. Alternatively, the decorative plant cover 96e may be free of a bonding material. The sleeve 12e applied to the flower pot 30e/decorative plant cover 74e assembly may have a bonding material (not shown) disposed on the inner peripheral surface 24e and/or the outer peripheral surface 20e thereof for bonding to the decorative plant cover 96e. Alternatively, the sleeve 12e may be free of a bonding material on any surface thereof. Although the sleeve 12e in FIGS. 30–32 is shown as having a pull bow 98, it will be understood by one of ordinary skill in the art that the sleeve 12e may be free of a pull bow 98, and that when a portion of the sleeve 12e is detached, the portion of the sleeve 12e that may be left surrounding the decorative plant cover 96e may simply function to cause the decorative plant cover 96e to be bound more firmly about an outer peripheral surface of the decorative plant cover 96e, or it may provide a decorative function as well, as described elsewhere herein.

As noted herein, any of the sleeves 12–12e may have perforations in various patterns to facilitate removal of a portion or portions of the sleeve 12–12e or of the entire sleeve 12–12e. The sleeve 12–12e may have other elements as described elsewhere herein for facilitating the removal of a portion or portions of the sleeve 12–12e, or of the entire sleeve 12–12e.

Figure 33:
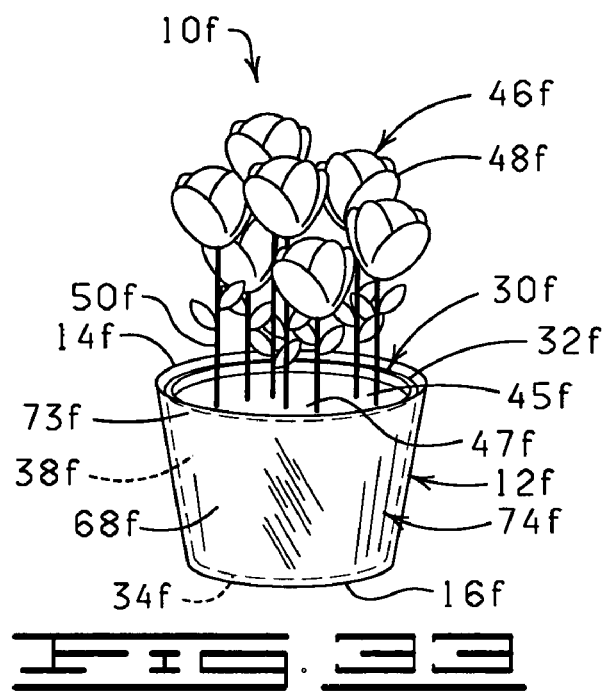
FIG. 33 is a perspective view of a plant package constructed in accordance with the present invention.
Figure 34:
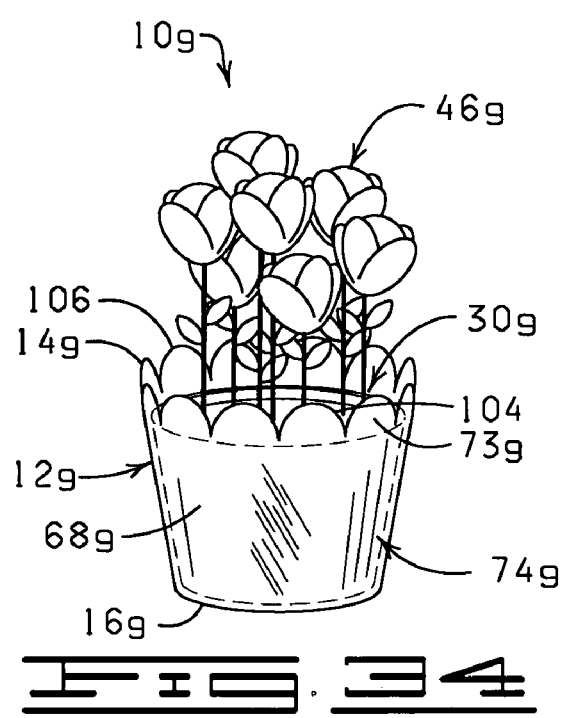
FIG. 34 is a perspective view of a plant package constructed in accordance with the present invention.

Description of FIGS. 33–34

Shown in FIG. 33 is a plant package 10f which comprises a flower pot 30f, a floral grouping 46f and a sleeve 12f. The plant package 10f may further comprise a growing medium 47f. The sleeve 12f is unitarily constructed and is continuously sealed from a first end 14f to a second end 16f thereof, as described herein before for the sleeve 12. The sleeve 12f is provided with a shape and size dimensioned in accordance with the flower pot 30f which has an upper end 32f, a closed lower end 34f, an outer peripheral surface 38f, and a pot retaining space 45f, in which the floral grouping 46f having a bloom portion 48f and stem portion 50f may be disposed.

The sleeve 12f comprises a lower portion 68f and a skirt portion 73f. The lower portion 68f is sized and dimensioned to closely surround and encompass the flower pot 30f, and the sleeve 12f has no perforations or other detaching elements formed therein. The decorative skirt portion 73f is formed from a portion of the sleeve 12f near the first end 14f thereof which extends away from the sleeve 12f and above the upper end 32f of the flower pot 30f when the sleeve 12f is positioned about the flower pot 30f. The sleeve 12f is positionable about the flower pot 30f, and the lower portion 68f of the sleeve 12f closely surrounds and encompasses the flower pot 30f when positioned about the flower pot 30f. The sleeve 12f may be constructed of similar materials and in a similar manner as any of the sleeves 12–12e described herein previously.

It will be understood that either the sleeve 12f and/or the skirt portion 73f may have overlapping folds or gussets (not shown) which permit the formation of the skirt portion 73f. Alternatively, no overlapping folds or gussets may be utilized. The decorative skirt portion 73f is positionable at differing angles, as described previously herein. It will be appreciated that the sleeve 12f and/or the flower pot 30f may be provided with a bonding material disposed thereupon, as previously described herein. Further, the skirt portion 73f may also have a bonding material disposed thereupon, on either surface of the decorative skirt portion 73f.

In a method of use, the flower pot 30f is positioned within the sleeve 12f as previously described herein, and the combination of the lower portion 68f and the decorative skirt portion 73f of the sleeve 12f form a decorative plant cover 74f. It will be appreciated that at least a portion of the decorative plant cover 74f, such as the lower portion 68f thereof, substantially surrounds and encompasses the flower pot 30f, while the decorative skirt portion 73f is disposed adjacent only a lower portion of the stem portion 50f of the floral grouping 46f disposed in the pot retaining space 45f of the flower pot 30f.

Shown in FIG. 34 is a plant package 10g which is substantially similar to the plant package 10f, except as described herein below. The plant package 10g comprises a sleeve 12g, a flower pot 30g and a floral grouping 46g disposed in the flower pot 30g. The sleeve 12g has a first end 14g, a second end 16g, a decorative lower portion 68g and a skirt portion 73g. The lower portion 68g of the sleeve 12g is sized and dimensioned such that the flower pot 30g may be disposed therein.

The first end 14g of the sleeve 12g comprises a plurality of curved portions 106 and has a scalloped upper edge 104 which provides a decorative design to the skirt portion 73g of the sleeve 12g of the plant package 10g. Such a plant package 10g may be constructed and utilized in the same manner as the plant package 10f described hereinbefore.

Changes may be made in the construction and the operation of the various components, elements and assemblies described herein or in the steps or the sequence of steps of the methods described herein without departing from the spirit and scope of the invention as defined in the following claims.

What is claimed is:

1. A plant package comprising a flower pot, a floral grouping and a preformed tubular sleeve, the plant package constructed by the method comprising:

providing a preformed flexible sleeve having an upper end and a closed lower end, the preformed flexible sleeve being continuously sealed from the upper end to the closed lower end and when opened having a generally frusto-conical shape prior to application about a flower pot, and the preformed flexible sleeve comprising:

a decorative lower portion sized and dimensioned to surround and encompass the flower pot; and a decorative skirt portion integral to the decorative lower portion and dimensioned to extend from the decorative lower portion a distance above an upper end of the flower pot when the preformed flexible sleeve is disposed about the flower pot, wherein the upper end of the preformed flexible sleeve is provided with a plurality of curved portions which provide a decorative design to the skirt portion; and disposing the flower pot having a floral grouping therein within the preformed flexible sleeve such that the decorative lower portion of the preformed flexible sleeve surrounds and encompasses the flower pot with the flower pot disposed on the closed lower end of the preformed flexible sleeve and wherein the decorative skirt portion is disposed adjacent only a lower portion of a stem portion of the floral grouping disposed in the flower pot thereby forming the plant package.

2. The plant package of claim 1 wherein the preformed flexible sleeve is constructed from a material selected from the group consisting of paper, foil, polymeric film, fabric, cardboard, fiber, burlap, cloth, and combinations thereof.

3. The plant package of claim 1 wherein the preformed flexible sleeve has a thickness in a range of from about 0.1 mil and about 30 mils.

4. The plant package of claim 1 wherein the preformed flexible sleeve is secured about the flower pot via a ribbon, a heat shrinkable material, a fastening material, a band, a barb, a weld, or an adhesive or cohesive bonding material.

5. The plant package of claim 1 wherein in the step of providing the preformed flexible sleeve, the preformed flexible sleeve is removed from a support device.

* * * * *